(12) United States Patent
Vinayakray-Jani (10) Patent No.: US 7,984,486 B2
(45) Date of Patent: Jul. 19, 2011

(54) USING GAA TO DERIVE AND DISTRIBUTE PROXY MOBILE NODE HOME AGENT KEYS

(75) Inventor: Preetida Vinayakray-Jani, Helsinki (FI)

(73) Assignee: Nokia Corporation, Espoo (FI)

( * ) Notice: Subject to any disclaimer, the term of this patent is extended or adjusted under 35 U.S.C. 154(b) by 902 days.

(21) Appl. No.: 11/946,459

(22) Filed: Nov. 28, 2007

(65) Prior Publication Data

US 2009/0138955 A1    May 28, 2009

(51) Int. Cl.
  *H04L 29/06* (2006.01)
  *H04L 9/32* (2006.01)
  *G06F 9/00* (2006.01)
(52) U.S. Cl. .................. 726/4; 713/2; 713/160; 713/168
(58) Field of Classification Search .......... 726/4; 713/2, 713/160, 168
  See application file for complete search history.

(56) References Cited

U.S. PATENT DOCUMENTS

| | | |
|---|---|---|
| 2002/0118674 A1 | 8/2002 | Faccin et al. |
| 2002/0120844 A1 | 8/2002 | Faccin et al. |
| 2003/0147537 A1 | 8/2003 | Jing et al. |
| 2005/0025091 A1 | 2/2005 | Patel et al. |
| 2006/0072759 A1 | 4/2006 | Gundavelli et al. |
| 2006/0104247 A1 | 5/2006 | Dommety et al. |
| 2006/0251257 A1 | 11/2006 | Haverinen et al. |
| 2007/0230453 A1 | 10/2007 | Giaretta et al. |

OTHER PUBLICATIONS

Bootstrapping mobile IPv6 using EAP; Bournelle, J.; Laurent-Maknavicius, M.; Giaretta, G.; Guardini, I.; Demaria, E.; Marchetti, L.; Networks, 2005. Jointly held with the 2005 IEEE 7th Malaysia International Conference on Communication., 2005 13th IEEE International Conference on; vol. 2 ; pp. 935-940.*

Web services on mobile devices-implementation and experience; Berger, S.; McFaddin, S.; Chandra Narayanaswami; Mandayam Raghunath; Mobile Computing Systems and Applications, 2003. Proceedings. Fifth IEEE Workshop on; Publication Year: 2003 , pp. 100-109.*

Composable Mediation for Security-Aware Mobile Services ; Tarkoma, S.; Prehofer, C.; Sovio, S.; Laitinen, P.; Communications Magazine, IEEE ; vol. 45 , Issue: 7 Publication Year: 2007 , pp. 58-65.*

(Continued)

*Primary Examiner* — David Y Jung
(74) *Attorney, Agent, or Firm* — Alston & Bird LLP (57) ABSTRACT

A Generic Authentication Architecture bootstrapping procedure is performed between a mobile terminal and a bootstrapping server function resulting in the mobile terminal and the bootstrapping server function each acquiring at least a bootstrapping transaction Identifier associated with the mobile terminal and a corresponding shared key. The mobile terminal derives a network application function specific key based on at least the acquired shared key and an identifier of said network application function. The bootstrapping transaction identifier and the network application function specific key are sent from the mobile terminal to the proxy mobile node. A request message for Mobile Internet Protocol registration is sent from the proxy mobile node to a home agent on behalf of the mobile terminal, the request message including the bootstrapping transaction identifier and an identifier of the proxy mobile node. The registration message is verified in the home agent with the use of a network application function specific key obtained from the bootstrapping server function or a network application function. The request message for Mobile Internet Protocol registration is authenticated with the proxy mobile node acting on behalf of the mobile terminal by verifying the message authentication code with the obtained network application function specific key.

18 Claims, 8 Drawing Sheets

OTHER PUBLICATIONS

The International Search Report for PCT Application No. PCT/IB2008/002890; Filed Oct. 29, 2008; Date of Completion Sep. 4, 2009; Date of Mailing Sep. 10, 2009.

The Written Opinion for PCT Application No. PCT/IB2008/002890; Filed Oct. 29, 2008; Date of Completion Sep. 4, 2009; Date of Mailing Sep. 10, 2009.

3GPP TR 33.922, V0.1.0: $3^{rd}$ Generation Partnership Project; Technical Specification Group Services and System Aspects; "*Security Aspects for Inter-Access Mobility Between Non 3GPP and 3GPP Access Network;*" (Release 7); Oct. 2007.

3GPP TR 33.922 V0.0.3; $3^{rd}$ Generation Partnership Project; Technical Specification Group Services and System Aspects; "*Security Aspects for Inter-Access Mobility Between Non 3GPP and 3GPP Access Network;*" (Release 7), Nov. 2006.

3GPP Document V0.0.3; $3^{rd}$ Generation Partnership Project; Technical Specification Group Services and System Aspects; "*Security Aspects for Inter-Access Mobility Between Non 3GPP and 3GPP Access network;*" (Release 7), Nov. 2006.

Nakhjiri, et al., "*EAP Based Proxy Mobile IP Key Bootstrapping: A WiMAX Applicability Example,*" Internet Draft draft-nakhjiri-pmip-key-02.txt, Feb. 2006.

\* cited by examiner

(a) Partial use of GBA  (b) Full use of GBA

USING GAA TO DERIVE AND DISTRIBUTE PROXY MOBILE NODE HOME AGENT KEYS

FIELD OF THE INVENTION

The present invention relates generally to the authentication of users in telecommunications networks. More particularly, the invention relates to using Generic Authentication Architecture (GAA) to secure mobile IP registration through Proxy Mobile IP Nodes.

BACKGROUND

A wireless communication network typically only permits authorized users to access resources and services within the network. The process of determining whether a user is authorized to access a network involves authentication to determine the identity of the user. A well known authentication technique is to use a removable Subscriber Identification Module (SIM) card. Many cellular systems such as those supporting General Packet radio Service (GPRS) and Third Generation Partnership Project (3GPP) standards use SIM cards for authentication. Once a user is authenticated, it can then be determined whether or not the user is authorized to access the services provided by the network. For example, it may be determined that the identified user is the user of a second network that has executed a roaming agreement so that its users can utilize the network and relevant services.

The Mobile Internet Protocol (Mobile IP) provides mobility to enable interworking between two networks with disparate authentication techniques so that e.g. resources and services within one network may be accessed by users of the other network and vice versa. As part of this interworking, service and session continuity is provided, particularly during handover between a Wireless LAN and a 3GPP system.

Mobile IP is an extension to the Internet Protocol (IP) aimed to provide mobility support in IP networks. Mobile IPv4 is specified by IETF RFC 3344. It allows a terminal device to move from one link to another without changing its IP address (as seen by the layers above IP) and yet be reachable by other terminal devices. Mobile IP requires the following three subscriber-specific parameters to be provisioned to a Mobile terminal: 1) a Home Address (or Mobile Node Network Access Identifier); 2) a symmetric key which is shared by the Mobile terminal and its Home Agent, and 3) a Security Parameter Index identifying one or more security association contexts of the Mobile terminal.

Processes have developed for distributing the necessary Mobile IP keys. However, these processes will not work in Mobile IP networks which support the use of Proxy Mobile Nodes (PMN). A Proxy Mobile Node is a Node that is responsible to securely register with the home network of an authenticated Mobile Node on its behalf. This is done to protect the privacy of the authenticated Mobile Node and to support its local mobility with minimum message overhead.

A 3GPP network with Radius support can distribute the Mobile IP relevant keys. But Radius requires explicit provision of Mobile IP specific keys as well as SIM relevant keys. Also, keys are provisioned specifically between mobile terminal and Home Agent (HA) or mobile terminal and Foreign Agent (FA). Hence, Radius is limited in its effectiveness to HA and FA only, and is not effective for networks using Proxy Mobile Nodes.

The Generic Authentication Architecture (GAA) included in Release 6 of the 3GPP standards specifies a general authentication and key distribution process. Using GAA, a shared symmetric key, identified with a bootstrapping transaction identifiers (B-TID), can be provisioned to a mobile terminal using USIM authentication. A Generic Bootstrapping Architecture (GBA) allows the mobile terminal to perform bootstrapping procedure with Bootstrapping Server Function (BSF) and a bootstrapping key or shared secret generated by both the mobile terminal and the bootstrapping server function. The bootstrapping server function also generates the bootstrapping transaction identifier and a lifetime of the Ks and delivers them to corresponding mobile terminal as a part of bootstrapping procedure. See 3GPP TS 33.220 v6.0.0 (March 2004).

Originally, GAA and GBA could not be used directly with Mobile IP since Mobile IP requires the three subscriber-specific parameters identified above to be provisioned to a Mobile terminal. However, methods have been developed for adapting GAA and GBA so that they can be used for Mobile IP key distribution in 3GPP networks. See commonly assigned U.S. patent application Ser. No. 11/179,607 filed on Jul. 13, 2005 and 3GPP TR 33.922 v0.0.3 (2006-11).

Some methods utilize the GAA with Mobile IP with only minor enhancements in the Home Agent. But these methods are based on the fact that the Mobile terminal functionally limits the applicability of such methods to those networks in which the Mobile terminals support Mobile EP. It also requires frequent registration requests in an environment of high mobility. The frequent registration requests may overwhelm the HA, and such a situation may eventually increase the signaling overheads and delays in the network.

A proxy mobile node can be used which generates the registration requests on behalf of mobile terminal. A proxy mobile node may be used regardless of whether or not the mobile terminal is enabled with Mobile IP functionality. However, unlike the mobile terminal itself, such proxy mobile node does not have any trust relationship with the home agent of the mobile terminal. Also, Proxy Mobile IP signaling across administrative domains/operators may expose unacceptable security relationships between a visited access network and a Home agent. Manual configuration of security association between domains with different security infrastructure may be problematic and not practical also.

There is therefore a need for a solution to provision the Mobile IP specific keys between the proxy mobile node and the home agent.

BRIEF SUMMARY

In light of the above background, the preferred embodiments of the invention extend the use of Generic Authentication Architecture (GAA) to derive and distribute PMN-HA keys in a Mobile IP supported network (MIPv4/v6) having proxy mobile nodes. They use a SIM/USIM type of authentication to provision the MIP specific keys for the proxy mobile node and home agent. The preferred embodiments leverage the use of GAA/3GPP in proxy mobile (MIPv4/v6) key distribution for entities supporting local and global mobility based on Mobile IP (MIP).

One aspect of the invention is a method of utilizing Generic Authentication Architecture for Mobile Internet Protocol key derivation and distribution in a packet data network having a proxy mobile node acting as a proxy for a mobile terminal. A Generic Authentication Architecture bootstrapping procedure is performed between a mobile terminal and a bootstrapping server function resulting in the mobile terminal and the bootstrapping server function each acquiring at least a Bootstrapping Transaction Identifier (B-TID) associated with the mobile terminal and a corresponding shared key. (Ks) The mobile terminal derives a network application function specific key based on the acquired shared key. The bootstrapping transaction identifier, the corresponding shared key, and optionally the encrypted network application function specific key are sent from the mobile terminal to the Proxy Mobile Node. (PMN) An initial request message for Mobile Internet Protocol registration is sent from the proxy mobile node to a home agent on behalf of the mobile terminal, the request message including the B-TID and an identifier of the proxy mobile node—PMN-ID. The registration message is verified in the home agent with the use of a network application function specific key obtained from the bootstrapping server function or a network application function and further forwarded to the Bootstrapping Server Function for authentication. The request message for Mobile Internet Protocol registration is authenticated with the proxy mobile node acting on behalf of the mobile terminal by verifying the message authentication code with the obtained Network Application Function (NAF) specific key.

The preferred embodiments of the invention have several advantages. They extend GAA to support local as well as global Mobile IP mobility. Finally, implementations of the preferred embodiments do not require the mobile terminals to support Mobile IP explicitly. Thus, conventional mobile terminals can receive the described benefits in any Mobile IP based 3GPP network which implements the preferred embodiments.

BRIEF DESCRIPTION OF THE DRAWINGS

In association with the following detailed description of the preferred embodiments, reference will now be made to the accompanying drawings, where like numerals in different figures refer to the same element, and in which.

DETAILED DESCRIPTION OF THE PREFERRED EMBODIMENTS

Preferred and exemplary embodiments of the present invention now will be described in detail with reference to the accompanying drawings. The preferred embodiments are described as being implemented in 3GPP compliant networks and to the extent any terminology in this detailed description is unclear, reference may be had to Release 6 (or Release 7 if necessary) of the 3GPP specification documents. It should be understood, however, that various embodiments of the present invention can be utilized in conjunction with a variety of other telecommunications network and are not limited to 3GPP compliant networks.

Figure 1:
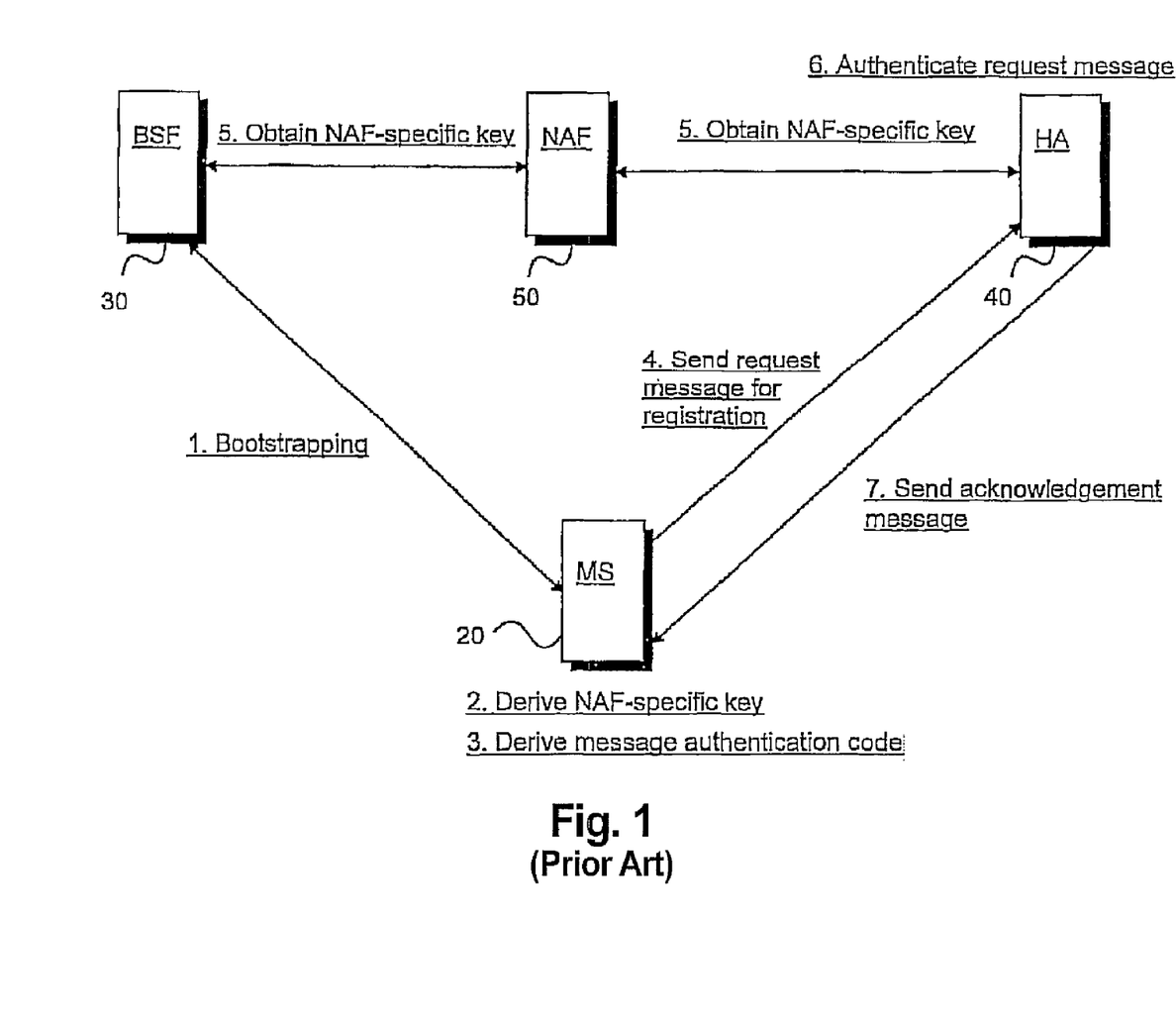
FIG. 1 is a diagram illustrating a prior art method of utilizing GAA for Mobile IP key distribution in a network without proxy mobile nodes.

FIG. 1 illustrates a prior art method relating to utilizing GAA for Mobile IP key distribution in a packet data network without Proxy Mobile Nodes. The packet data network comprises a mobile terminal device 20, a Bootstrapping Server Function 30, a Home Agent 40 associated with the mobile terminal device 20, and Network Application Function 50.

In step 1, a GAA bootstrapping procedure is performed between the mobile terminal device 20 and the BSF 30. As a result, the mobile terminal device 20 and the BSF 30 each acquire at least a Bootstrapping Transaction Identifier (B-TID) associated with the mobile terminal device 20 and a corresponding shared key. At step 2, a key specific to NAF 50 is derived with the mobile terminal device 20 on the basis of at least the shared key acquired at step 1, and the identifier of NAF 50. At step 3, a message authentication code is derived with the mobile terminal device 20 on the basis of at least the derived key specific to NAF 50.

In step 4, a request message for Mobile IP registration is sent from the mobile terminal device 20 to HA 40. The request message comprises the derived message authentication code and an identifier of the mobile terminal device 20. At step 5, the key specific to NAF 50 is obtained with the Home Agent 40 from BSF 30 or NAF 50. The NAF specific key is obtained on the basis of the received identifier of the mobile terminal device 20. At step 6, the received request message for Mobile Internet Protocol registration is authenticated with the Home Agent 40 by verifying the received message authentication code with the obtained Network Application Function specific key. At step 7, an acknowledgement message is sent, in response to successful authentication, to the mobile terminal device 20 to indicate successful Mobile Internet Protocol registration. Further details may be found in commonly assigned U.S. patent application Ser. No. 11/179,607 filed on Jul. 13, 2005, which is hereby incorporated by reference in its entirety.

The prior art method shown in FIG. 1 requires the mobile terminals to support Mobile IP and to be responsible for sending binding updates. The preferred embodiments of the present required to support Mobile IP and they may include Proxy Mobile Nodes. The conventional role of a Proxy Mobile Node (PMN) is to protect the privacy and reduce frequent binding updates of the mobile terminal while supporting its local and global mobility. The proxy mobile node does not have any trust relationship with the mobile terminal's home agent and also the mobile terminal may not trust the proxy mobile node. In the following preferred embodiments of the invention, the proxy mobile node (not the mobile terminal) is responsible for sending binding updates to the home agent. Hence, through GAA, the proxy mobile node develops the trust with the home agent and sends the registration or binding update request to the home agent. By sending the binding update, the proxy mobile node also enables global mobility for the mobile terminal.

The first and the third preferred embodiments make full use of GBA to derive and distribute PMN-HA keys. The main objective is to extend the use of GAA for secure mobile IP registration through Proxy Mobile IP node. The Proxy mobile node in the foreign network is responsible to securely issue mobile IP registrations on behalf of a mobile terminal, where the mobile terminal has neither prior trust relationship with visited access network nor PMN in foreign network has prior trust relationship with home network of mobile terminal.

Figure 2:
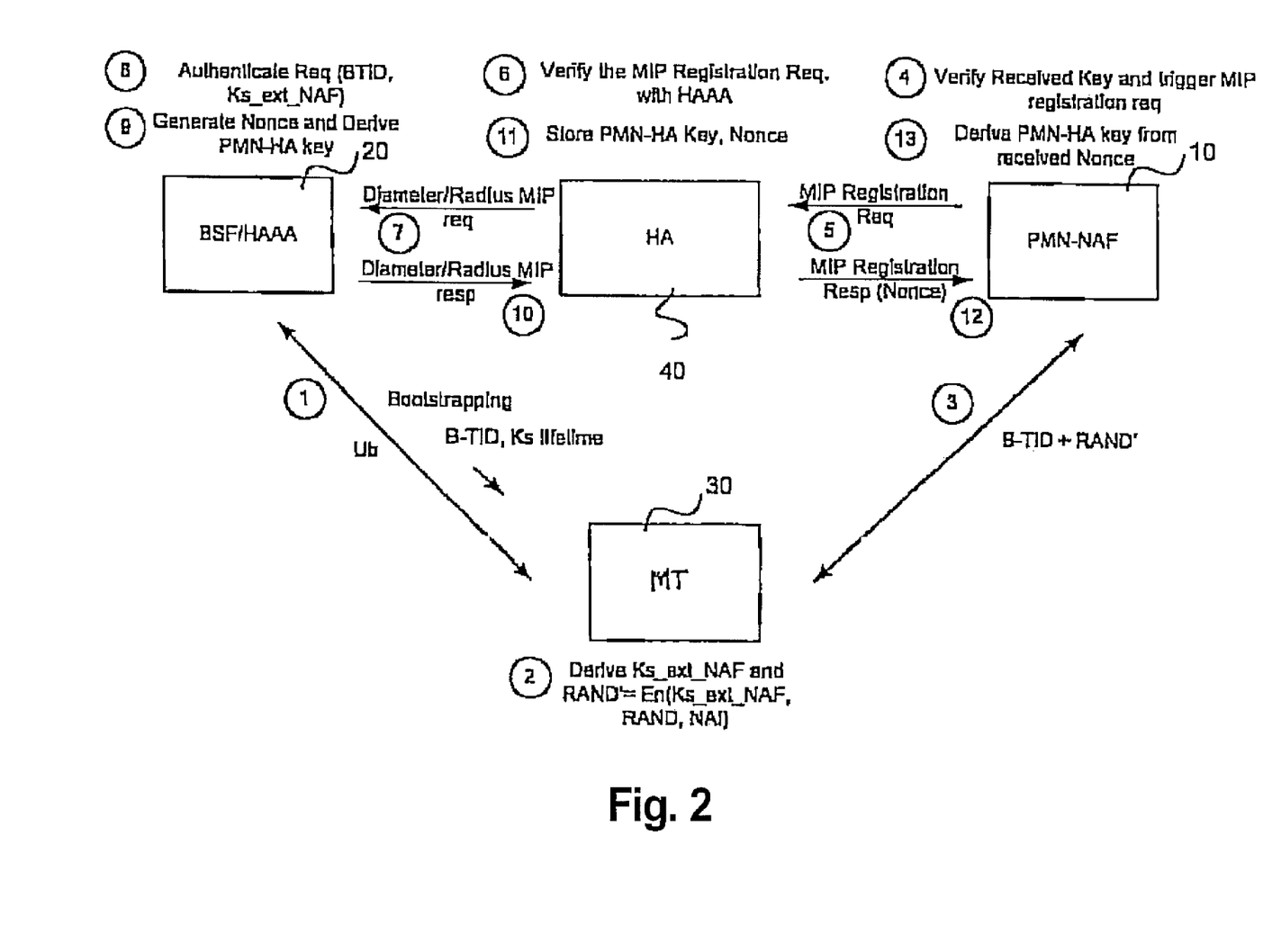
FIG. 2 is a block diagram illustrating a method of fully utilizing GBA in a first preferred embodiment of the invention where the HAAA distributes keys to the Home Agent using Zn interface.

FIG. 2 shows the mobile IP based PDN model along with GAA comprising a proxy mobile node, preferably supported with Network Application Function as shown (PMN-NAF) 10, a Bootstrapping Server Function with Home Authentication Authorization and Accounting (BSF/HAAA) 20, a mobile node or terminal (MT) 30, and Home Agent (HA) 40, which is enhanced with Network Application Function (NAF) and capable to understand proxy MIP registration request. In this embodiment, MT 30 can have either support of Mobile or (MIP) or not. In order to permit MT 30 to use MIP specific network as well as to support network enhanced terminal local mobility, PMN 10 is connected to MT 30. MT 30 is authenticated based on the GAA and MIP relevant messages that pass between PMN 10 and HA 40. The MIP registration messages are formulated and delivered by PMN 10 only, hence it is referred to here as P-MIP registration.

Figure 3:
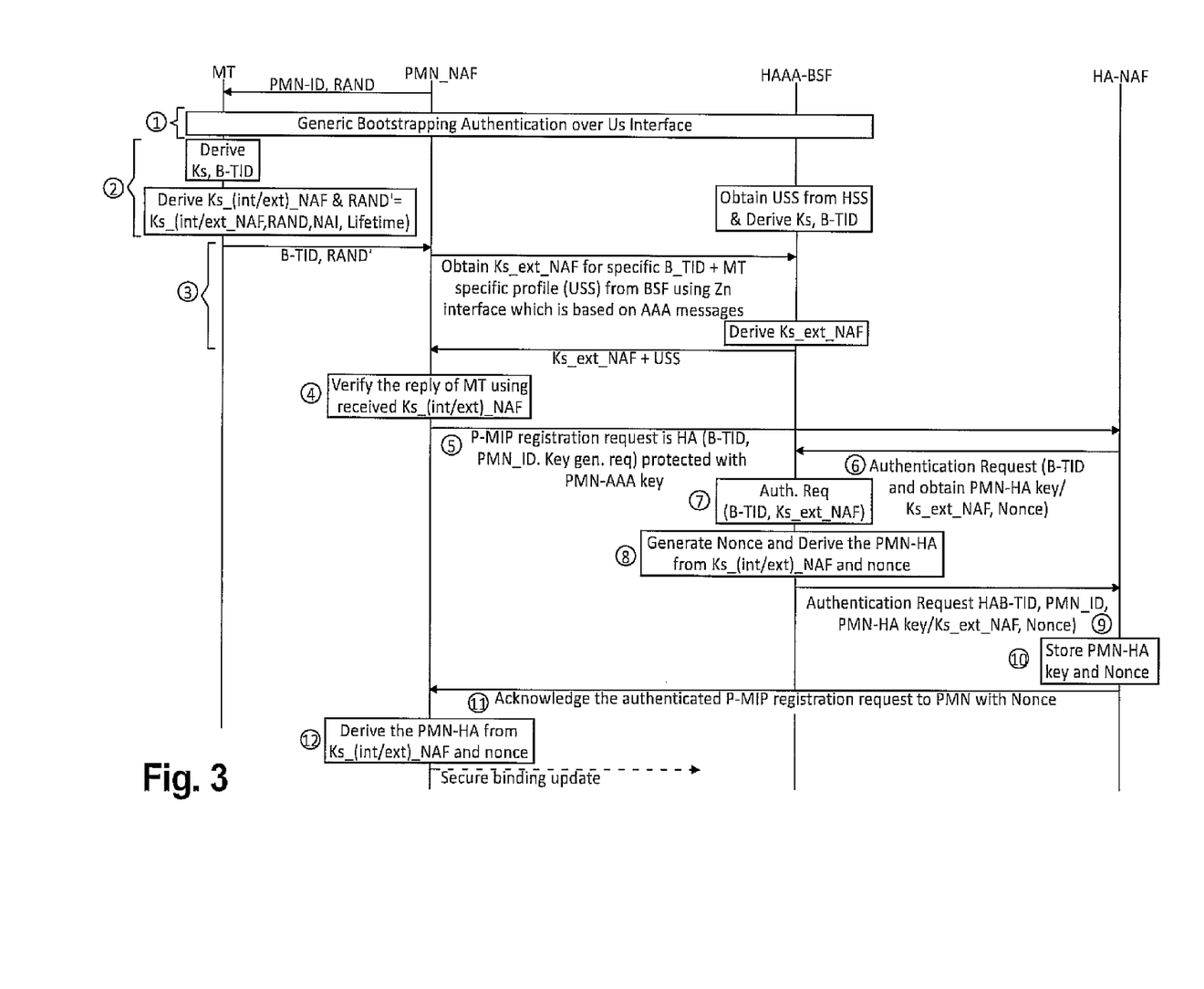
FIG. 3 is a flow diagram showing the full use of GBA signaling messages in the first preferred embodiment of the invention.

FIG. 3 is a flow diagram showing the signaling messages in the first preferred embodiment making full use of GBA. First, the bootstrapping procedure is performed between MT 30 and BSF 20. During bootstrapping, mutual authentication is performed between the MT 30 and the home network, and base key Ks are generated by MT 10 and BSF 20. Associated Ks include a B-TID and lifetime of Ks. Once bootstrapping completed, MT 30 makes use of the bootstrapped security association with a PMN-NAF. MT 30 conveys the received B-TID and optionally additional parameters if necessary to PMN-NAF 10. Upon receiving the B-TID from MT 30, PMN-NAF 10 contacts BSF 20 over a Zn interface to obtain Ks_ext_NAF. PMN-NAF 10 provides the B-TID and PMN-NAF_ID. BSF 20 derives the Ks_ext_NAF (also known as PMN-AAA key) from base key Ks and provides Ks_ext_NAF and the User Security Setting (USS) profile to PMN-NAF 10. PMN-NAF 10 formulates the registration request to HA-NAF by extending it with B-TID, PMN-NAF_ID and key generation nonce request. Such message is protected by means of PMN-AAA key. The HA-NAF generates the authentication requests and delivers it to BSF/HAAA 20, which eventually verifies the B-TID and PMN-NAF_ID and generates the nonce value. With the generated nonce value and stored PMN-AAA key, it derives NAF. The HA-NAF authorizes the registration request, and stores the PMN-HA key and nonce value. Finally, HA-NAF acknowledges the registration response to PMN-NAF 10 with nonce value. PMN-NAF 10 derives the PMN-HA key from the received nonce value and the PMN-AAA key.

Figure 4:
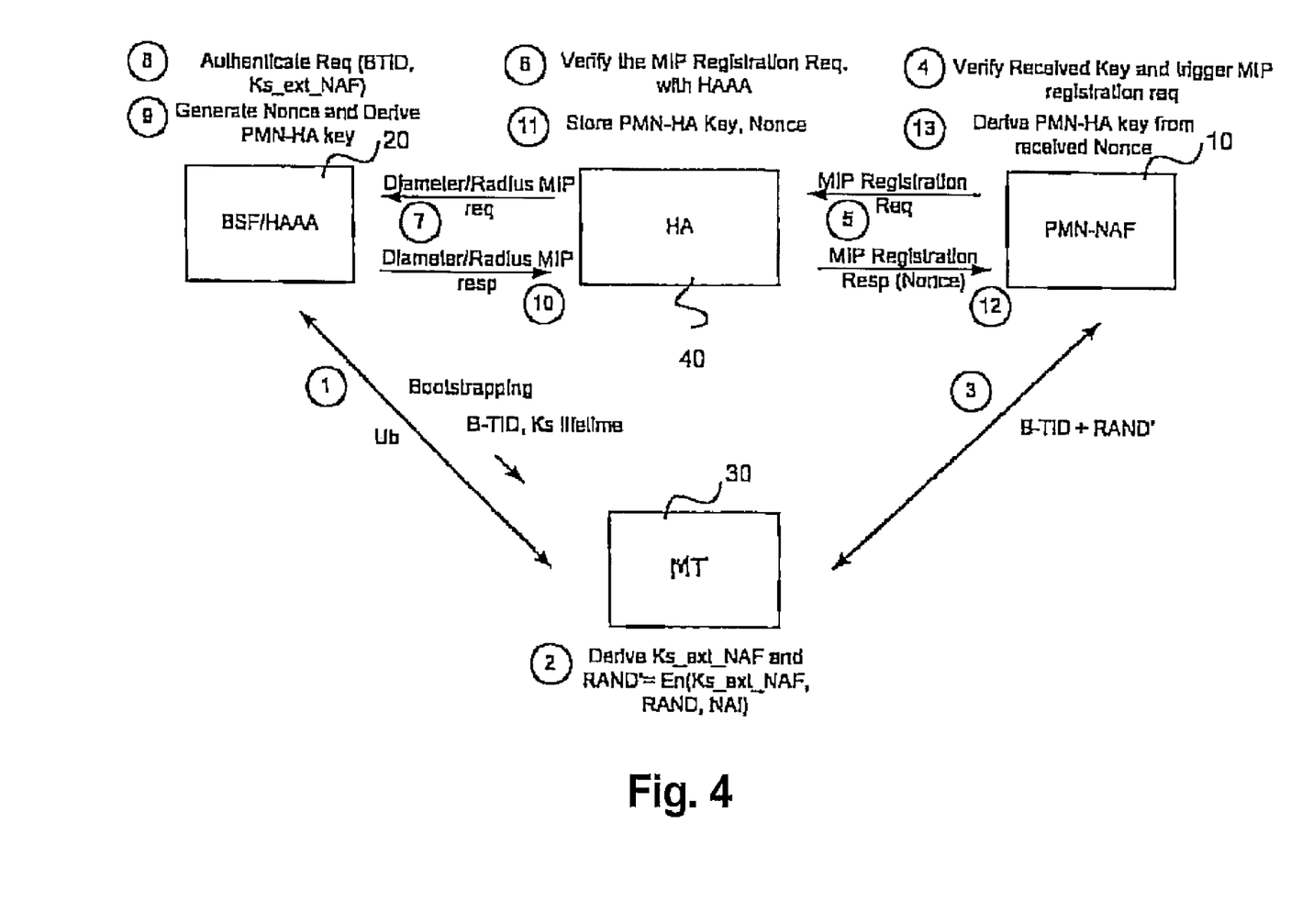
FIG. 4 is a block diagram of a method of partial using GBA to derive and distribute keys according to a second preferred embodiment of the invention where the HAAA is associated with NAF.

The second preferred embodiment of the invention is a Mobile IP specific key distribution making only partial use of GBA to generate and distribute the PMN-HA key. FIG. 4 is a block diagram showing the second embodiment. The addresses acquired by MT 30 could be independent of the bootstrapping procedure. If addresses are acquired by MT 30 as a part of the bootstrapping procedure, then the last message of XML body of bootstrapping "200 OK" element should add a new element.

In terms of being in a home network or roaming, the HA and FA should convey key (or its variant PMN-HA key) to PMN. When in the same network or domain, this should be no problem. Once PMN receives the key (or variant PMN-HA key), it can follow the proxy registration process with HA 40 using conventional MIP registration specific messages as defined by IETF. Preferably, in order to support both versions of MIP, i.e. MIPv6 and MIPv4, there is a distribution of keys from AAA to HA. This embodiment allows the HA, FA, and the PMN to be conventional apparatus. In other words, they do not need NAF specific support as with the first embodiment.

As shown in FIG. 4, the bootstrapping procedure between BSF 20 and MT 30 is stage (1). As a part of this stage, the HAAA server downloads the USS about MT 30. During the bootstrapping procedure between BSF 20 and MT 30, BSF 20 generates the B-TID and Ks and Ks. This key is used to derive the keying material for authorized services in the visited domain, a session key for use between MT 30 and a HA, and a PMN-AAA key. This keying material may also include a proxy mobile node-home agent (PMN-HA) key or further be used to derive PMN-HA key.

In the case of MT 30 of roaming into a visited domain, it delivers its MN-NAI to the Foreign Agent (FA) in order to receive the details from FA the type of authentication it supports. Assuming that visited network supports the GBA type authentication, MT 30 is obliged to follow bootstrapping process. However, during the initiation process MT 30 should include the visited domain specific details also, so BSF/HAAA 20 knows for whom it derives the key material and what additional key parameters are needed.

BSF/AAA 20 informs the successful authentication to visited domain and also provides the keying material to the visited AAA server or NAS. Based on the received 1st keying material, the AAA server in the home domain as well as in the visited domain, generates the 2nd cryptographic key. This second cryptographic key may comprise a proxy mobile node AAA key—i.e. PMN-AAA key. A visited domain AAA server may trigger PMN 10 to generate MIP registration specific request to obtain the PMN-HA key. In order to do so, PMN 10 should have a PMN-AAA key from AAA server or a cryptographic key material generated from the received key from BSF/HAAA. PMN 10 generates the MIP registration request that may include message authentication code and key generation Nonce request extension, including the credentials of MT 30 as an authenticator extension.

The corresponding FA will forward the proxy MIP registration request to HA 40. HA 40 then contacts BSF/HAAA 20 (stage 7). BSF/HAAA 20 authenticates the B-TID and derives the Ks_ext_NAF for received PMN_ID (stage 8, 9).

The HAAA server needs to have Ks_ext_NAF key as it is supposed to be generated by BSF using Ks and other inputs to KDF. Therefore, the HAAA server will fetch Ks_ext_NAF from BSF 20. The HAAA eventually authenticates the Diameter/Radius MIP request from HA 40, derives the PMN-HA key, and generates the Nonce. It delivers these parameters through a Diameter/Radius response to HA 40 (stage 10). HA 40 stores the received PMN-HA key and Nonce value (stage 11). HA 40 delivers the MIP registration response message by acknowledging with Nonce value to PMN 10 (stage 12). With the help of received Nonce and PMN-AAA key, PMN 10 derives the PMN-HA key (stage 13).

It is thus feasible to derive keys with partial support of GBA according to this second preferred embodiment. In such a case, HA 40 needs to be adapted to be able to understand the proxy mobile IP specific registration messages. Such adaptation will include setting the proxy registration flag 'P' to indicate to HA 40 that the binding update is from a PMN.

Figure 5:
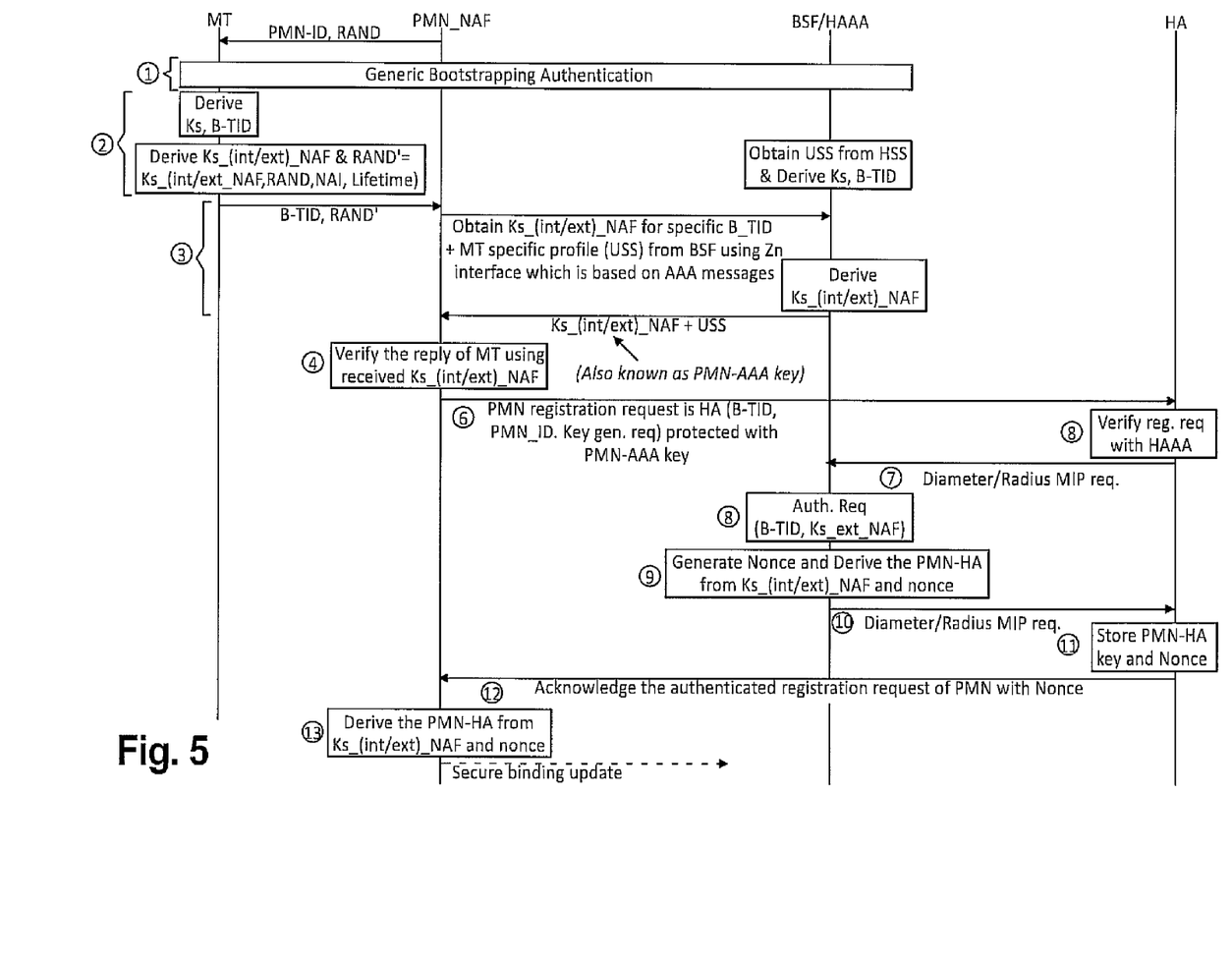
FIG. 5 is a flow diagram showing the partial use of GBA signaling messages in the second preferred embodiment of the invention.

FIG. 5 is a flow diagram showing the messages exchanged to derive and distribute the PMN-HA key in the second preferred embodiment. In this embodiment, the PMN is a PMN-NAF 10 that supports NAF type functionality and the BSF is a BSF/HAAA 20 integrated with HAAA.

The first stage (1) is the generic bootstrapping performed between MT 30 and BSF/HAAA 20 in the home network. BSF/HAAA 20 generates B-TID; shared keys (Ks) also known as a base secret key, and the lifetime of Ks. The B-TID is in Network Access Identifier (NAI) format and generated by taking base64 encoded random challenge value and the server name of BSF/HAAA 20 (for example, base64encode (RAND)@BSFservers_domain name. BSF/HAAA 20 sends a message including B-TID and lifetime of shared key Ks to MT 30 to indicate successful authentication.

At stage (2), MT 30 generates the shared base key Ks with received authentication specific parameters from BSF/HAAA 20. MT 30 and BSF/HAAA 20 will use the shared key Ks to derive Network Application Function specific key (Ks_NAF or Ks_(int/ext)_NAF).

At stage (3), MT 30 conveys the B-TID and optionally additional parameters if necessary to PMN-NAF 10. Upon receiving the B-TID from MT 30, PMN-NAF 10 contacts BSF 20 over a Zn interface to obtain Ks_(int/ext)_NAF. PMN-NAF 10 provides the B-TID and PMN-NAF_ID. BSF 20 derives the Ks_(int/ext)_NAF (known as PMN_AAA key) from base key Ks and provides Ks_(int/ext)_NAF and the USS to PMN-NAF 10. At stage (4), upon the received Ks_(int/ext)_NAF key, PMN-NAF 10 verify the reply of MT by using the received Ks_(int/ext)_key.

At stage (5), PMN-NAF 10 formulates the Proxy registration request extended authentication request with B-TID, PMN-NAF_ID, Key generation nonce request and forwards it to HA 40. PMN-NAF 10 may protect the message with a PMN-AAA key. HA 40 forwards such authentication request through Diameter/radius MIP (or using non Zn interface) access authentication request messages to BSF/HAAA 20 (stage 7)). The BSF/HAAA 20 authenticates the received Diameter/radius MIP authentication request of HA 40; generates the Nonce; and derives the PMN-HA key from nonce and Ks_(int/ext)_NAF (also known as PMN-AAA key). It delivers Nonce and PMN-HA key to HA 40 by means of an authentication response (stage 10). With a successful authentication response, HA 40 stores the received nonce value and key as PMN-HA key (stage 11). HA 40 formulates the successful registration response, and forwards the nonce to PMN-NAF 10 (stage 12), which eventually derives the PMN-HA shared secret key from the received nonce and PMN-AAA key or Ks_(int/ext)_NAF.

In this second embodiment, HA 40 does not need to be enhanced with NAF, but some enhancement is needed for it to understand that received registration message is relevant to proxy MN registration request message. In the first preferred embodiment, HA 40 is associated with NAF. In this second embodiment, the HA is not optimized with NAF, and a conventional HA may be utilized. The embodiment works well with partial support of GBA since the HA can communicate with as Zn and Ua interface becomes redundant.

Figure 6:
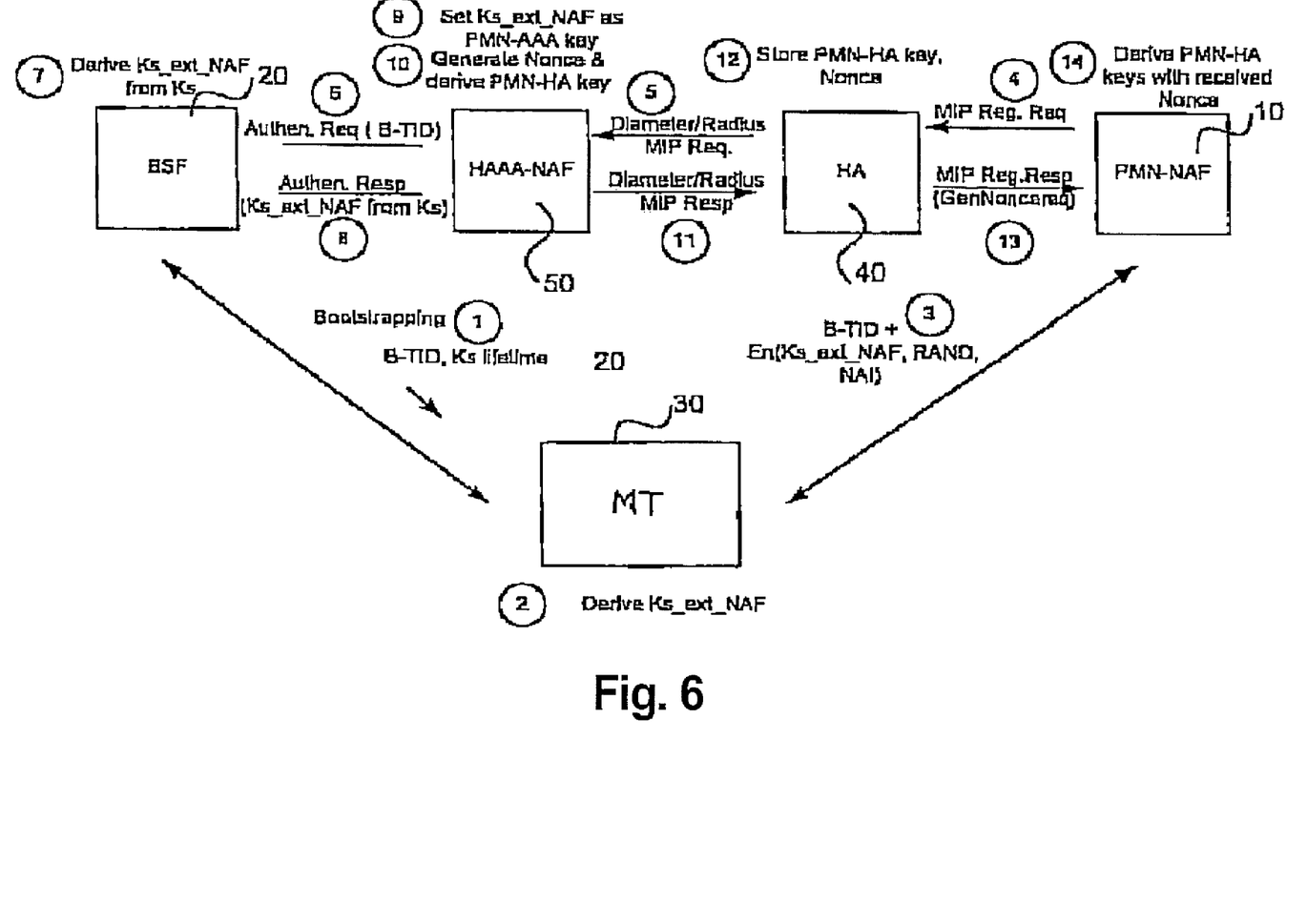
FIG. 6 is a block diagram showing the full use of GBA to derive PMN-HA keys in the third preferred embodiment of the invention.
Figure 7:
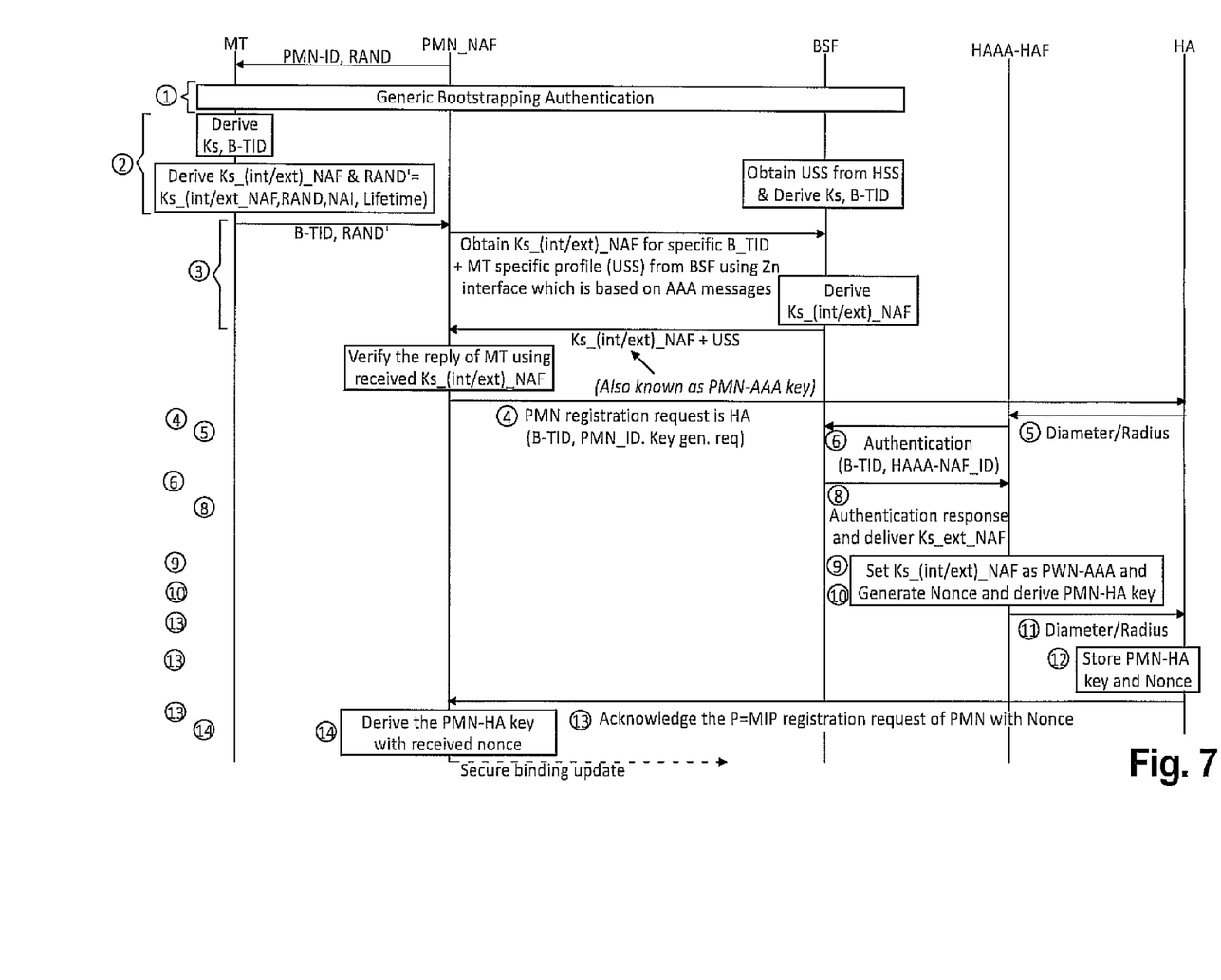
FIG. 7 is a flow diagram showing the signaling messages in the third preferred embodiment of the invention

In the third embodiment, where GBA is fully used to derive and distribute the PMN-HA key, HAAA is enhanced with NAF into a new network element 50. FIG. 6 is a block diagram showing how GBA is used to derive and distribute PMN-HA keys in a MIPv4/v6 network with HAAA-NAF 50. FIG. 7 is a flow diagram showing the signaling messages among the network elements in FIG. 6.

The first three stages of the third embodiment are similar to those in the first embodiment. The first stage (1) is the generic bootstrapping performed between MT 30 and BSF/HAAA 20 in the home network. BSF/HAAA 20 generates B-TID; shared keys (Ks) also known as a base secret key, and the lifetime of Ks. The B-TID is in Network Access Identifier (NAI) format and generated by taking base64 encoded random challenge value and the server name of BSF/HAAA 20 (for example, base64encode(RAND)@BSFservers_domain name. BSF/HAAA 20 sends a message including B-TID and lifetime of snared key Ks to MT 30 to indicate successful authentication.

At stage (2), MT 30 generates the shared base key Ks with received authentication specific parameters from BSF/HAAA 20. MT 30 and BSF/HAAA 20 will use the shared key Ks to derive Network Application Function specific key (Ks_NAF or Ks_(int/ext)_NAF).

At stage (3), MT 30 conveys the B-TID and optionally additional parameters if necessary to PMN-NAF 10. Upon receiving the B-TID from MT 30, PMN-NAF 10 contacts BSF 20 over a Zn interface to obtain Ks_(int/ext)_NAF. PMN-NAF 10 provides the B-TID and PMN-NAF_ID. BSF 20 derives the Ks_(int/ext)_NAF (known as PMN_AAA key) from base key Ks and provides Ks_(int/ext)_NAF and the USS to PMN-NAF 10.

Alternatively, stage (3) can be divided into two stages. First, PMN-NAF 10 may receive the B-TID and other optional details from MT 30 and formulate the message to verify the B-TID and relevant contents from BSF 20. Then BSF 20 verifies the B-TID and generates the KS_(Int/ext)_NAF for PMN-NAF 10 and delivers it to PMN-NAF 10. PMN-NAF 10 then verifies the received key response from BSF 20.

In either case, PMN 10 can then start MIP related signalling with the HA 40 by sending a registration request including B-TID, PMN_ID, key generation nonce request protects with PMN-AAA key or Ks_ext_NAF key (stage 4). HA 40 then delivers to HAAA-NAF 50 using Diameter/radius messages (stage 5). The HAAA-NAF 50 does not have the PMN-AAA key, as the PMN-AAA keys is supposed to be generated by the BSF 20 using Ks and other inputs to a KDF. Therefore, HAAA-NAF 50 will contact the BSF 20 and fetch the PMN-AAA key (Ks_ext_NAF) HAAA-NAF 50 needs to authenticate PMN 10. BSF 20 derives the Ks_ext_NAF based on the B-TID and PMN_ID it receives in the Authentication request. BSF 20 formulates the Authentication Response message and delivers the Ks_ext_NAF to HAAA-NAF 50 (stage 8). The HAAA-NAF 50 sets the received Ks_ext_NAF as PMN-AAA key (stage 9). The HAAA-NAF 50 generates Nonce value and derives the PMN-HA key (stage 10). In a Diameter/radius MIP response, HAAA-NAF 50 delivers the PMN-HA key and Nonce to HA 40 (stage 11). HA 40 stores such key as PMN-HA key and Nonce (stage 12). Finally HA 40 acknowledges the proxy registration request and delivers the Nonce value to PMN (stage 13). The PMN 10 extracts the Nonce value and together with received Ks_ext_NAF from MT 30, it generates the PMN-HA key (stage 14).

To summarize the first and third embodiments, both Mobile IP and a Network Application Function are combined in PMN-NAF 10, which authenticates the mobile terminal using GAA. It also handles the Mobile IP based messaging on behalf of MT 30 regardless of whether or not MT 30 is Mobile IP enabled or not. As per Mobile IP standardization by IETF, PMN-NAF 10 requires the mobile node network access identifier (NAI) or Home address; a symmetric key shared by MT 30 and HA 40, and a security parameter index identifying the secure association to be provisioned at MT 30. The security parameter index values as a part of IKEv2 negotiation between MT 30 and HA become redundant, as B-TID already identifies the key uniquely and can be used without any modifications as MN NAI. This advantage significantly leverages the effective and efficient use of the Home Agent as well as Mobile Terminals while making IPsec type SA redundant.

But GAA can only be used to provision a key and B-TID. Hence, PMN-NAF 10 asks BSF 20 for a service key—NAF. However, during access initiation procedure in a foreign network, the MT 30 already receives the information relevant to the proxy node, responds to it using generic authentication architecture, and authenticates itself with BSF 20. Following the authentication process with BSF 20, PMN-NAF 10 generates the registration request message and delivers it to HA 40. HA 40 verifies the service specific parameters associated with registration message, with the help of the service specific keys received from BSF 20, authenticates the PMN-NAF 10, and responds to the registration request by generating registration reply with registration specific keys and additional parameters to PMN-NAF 10.

The first and third embodiments thus require NAF support in PMN. However, the mobile IP bootstrapping requirement makes it possible to only partially use GBA (rather than fully use GBA) to derive the PMN-HA keys.

Figure 8:
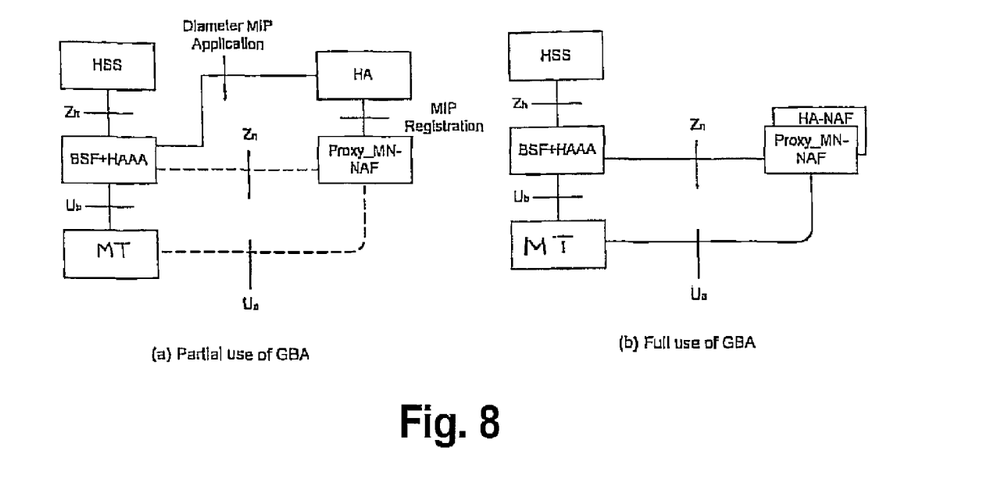
FIGS. 8(a) and 8(b) are reference models showing the partial use, and full use, respectively, of GBA in PMN registration while bootstrapping in home network
Figure 9:
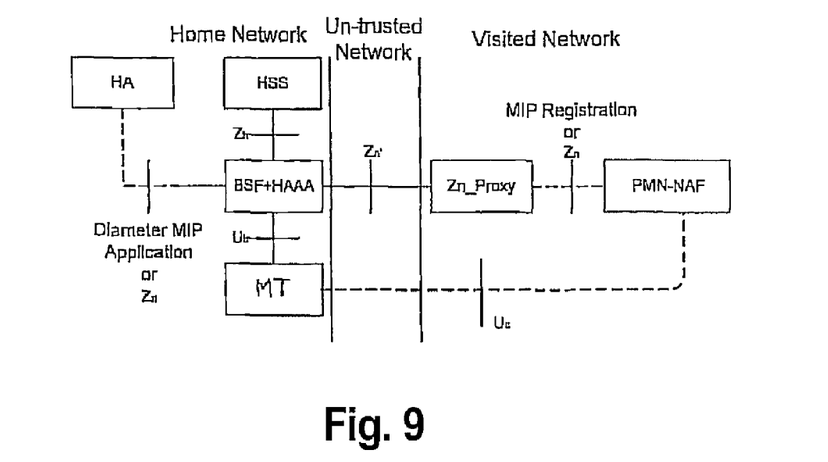
FIG. 9 is a reference model of PMN registration while bootstrapping visited Network using full or partial GBA support

FIGS. 8(*a*) and 8(*b*) are reference models illustrating the differences between partial use of GBA, and full use of GBA, respectively, with MIP based network entities in the PMN registration while bootstrapping in a home network. In full GBA there is a Zn interface between PMN-NAF and BSF/HAAA. This Zn interface can either be HTTP/SOAP based or Diameter/Radius based and that makes the NAF library. When making partial use of GBA, Ua and Zn interfaces can be made redundant (shown as dotted line in FIG. 8(*a*) and FIG. 9) for PMN and HA/FA. This is possible since there is only one MIP specific entity with which MT or PMN share a key—HA. FIG. 9 is a roaming network reference model of GBA with MIP based network entities in PMN registration while bootstrapping in a visited network using full or partial support of GBA in home network.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of utilizing Generic Authentication Architecture for Mobile IP key distribution in a packet data network having a proxy mobile node acting as a proxy for a mobile terminal, the method comprising:
    performing a generic authentication architecture bootstrapping procedure between the mobile terminal and a bootstrapping server function resulting in said mobile terminal and said bootstrapping server function each acquiring at least a bootstrapping transaction Identifier associated with said mobile terminal and a corresponding shared key;
    deriving, with said mobile terminal, a network application function specific key based on at least said acquired shared key and an identifier of said network application function;
    sending said bootstrapping transaction identifier, the corresponding shared key, and the network application function specific key from said mobile terminal to said proxy mobile node;
    sending a request message for Mobile IP registration from said proxy mobile node to a home agent on behalf of said mobile terminal, said request message including said bootstrapping transaction identifier and an identifier of said proxy mobile node;
    verifying the registration message in said home agent with the use of a network application function specific key obtained from said bootstrapping server function or a network application function; and
    authenticating said request message for Mobile IP registration with said proxy mobile node on behalf of said mobile terminal by verifying said message authentication code with said obtained network application function specific key.

2. The method according to claim 1, further comprising the step of: sending, in response to successful authentication, an acknowledgement message to said mobile proxy node to indicate successful Mobile IP registration.

3. The method according to claim 1, wherein a subsequent request message for Mobile IP registration received from said mobile proxy node on behalf of said home agent is authenticated by utilizing said obtained network application function specific key.

4. The method according to claim 1, wherein said identifier of said mobile terminal device comprises a Network Access Identifier of said mobile terminal device.

5. The method according to claim 1, wherein said identifier of said network application function comprises a Domain Name Server name of said network application function.

6. The method according to claim 1, wherein said identifier of said network application function comprises an IP address of said network application function.

7. The method according to claim 1, wherein said network application function is associated with said home agent, and wherein said identifier of said network application function comprises a Domain Name Server name of said home agent.

8. The method according to claim 1, wherein said network application function is associated with said home agent, and wherein said identifier of said network application function comprises an IP address of said home agent.

9. A proxy mobile node acting as a proxy for a mobile terminal in a packet data network, said proxy mobile node being adapted to:
    receive, from said mobile terminal, a bootstrapping transaction identifier associated with said mobile terminal and a corresponding shared key, said bootstrapping transaction identifier and said corresponding shared key being acquired from a Generic Authentication Architecture bootstrapping procedure between the mobile terminal and a bootstrapping server function;
    send a request message for Mobile IP registration to a home agent on behalf of said mobile terminal, said request message including said bootstrapping transaction identifier and an identifier of said proxy mobile node; and
    authentication of said request message for Mobile IP registration sent on behalf of said mobile terminal, said request message being authenticated by verifying said message authentication code with said obtained network application function specific key.

10. A proxy mobile node as recited in claim 9, wherein said proxy mobile node includes a network application function.

11. A proxy mobile node as recited in claim 9, wherein a proxy mobile node-home agent (PMN-HA) key is derived.

12. A home agent in a packet data network having a proxy mobile node acting as a proxy for a mobile terminal, the home agent being adapted to:
    receive a request message for Mobile IP registration from said proxy mobile node on behalf of said mobile terminal, said request message including a bootstrapping transaction identifier and an identifier of said proxy mobile node;

verify the registration message with the use of a network application function specific key obtained from a network application function or a bootstrapping server function providing said bootstrapping transaction identifier; and after said verification, authenticate said request message for Mobile Internet Protocol registration received from said proxy mobile node on behalf of said mobile terminal.

13. A home agent as recited in claim 12, further comprising the step of: sending an acknowledgement message to said mobile proxy node to indicate successful Mobile Internet Protocol registration.

14. A home agent as recited in claim 12, and further having an associated network application function.

15. A home agent as recited in claim 12, wherein a proxy mobile node-home agent (PMN-HA) key is derived.

16. A bootstrapping server function in a packet data network having a proxy mobile node acting as a proxy for a mobile terminal, said bootstrapping server function being adapted to:

perform a generic authentication architecture bootstrapping procedure with said mobile terminal, said procedure resulting in the acquisition of at least a bootstrapping transaction Identifier associated with said mobile terminal and a corresponding shared key;

send said bootstrapping transaction Identifier and said corresponding shared key to said mobile terminal;

receive an authentication request from a home agent related to a Mobile IP registration request by said proxy mobile node on behalf of said mobile terminal; and send, to said home agent, an authentication response to said authentication request from said home agent related to a Mobile IP registration request by said proxy mobile node.

17. A bootstrapping server function as recited in claim 16, wherein said bootstrapping server function verifies a message authentication code in said authentication request with a network application function specific key obtained as a result of said bootstrapping procedure.

18. A bootstrapping server function as recited in claim 16, wherein a proxy mobile node-home agent (PMN-HA) key is derived.

* * * * *

UNITED STATES PATENT AND TRADEMARK OFFICE
CERTIFICATE OF CORRECTION

PATENT NO. : 7,984,486 B2
APPLICATION NO. : 11/946459
DATED : July 19, 2011
INVENTOR(S) : Vinayakray-Jani It is certified that error appears in the above-identified patent and that said Letters Patent is hereby corrected as shown below:

Column 2
Line 22, following "functionally" insert --supports Mobile IP and shares specific security contexts with the Home Agent a priori. This--;
Line 24, "Mobile EP" should read --Mobile IP--;
Line 54, following "(MIPv4/v6)" insert --node supported mobile IP network and extend the GAA solution/3GPP for mobile IP specific--.

Column 3
Line 20, following "extend" insert --the use of GAA for Mobile IP specific key derivation and distribution. They leverage the use of--.

Column 4
Line 48, following "present" insert --invention differ from the prior art method of Fig. 1 insofar as the mobile terminals are not--.

Column 5
Line 14, "Mobile or (MIP) or not" should read --Mobile IP (MIP) or not--.
Line 44, following "derives" insert --the Ks_ext_NAF - PMN-HA key. The derived PMN-HA key and Nonce are delivered to HA--.

Column 6
Line 8, "Ks and Ks" should read --Ks and lifetime of Ks. BSF 20 delivers the B-TID and Ks lifetime to MT 30 and MT 30 generates the Ks--;
Line 39, following "BSF/HAAA 20" insert --using a Diameter/radius MIP message--.

Column 8
Line 2, "snared" should read --shared--.

Signed and Sealed this
Second Day of October, 2012

David J. Kappos
*Director of the United States Patent and Trademark Office*